(12) United States Patent
Beck (10) Patent No.: US 8,667,733 B2
(45) Date of Patent: Mar. 11, 2014

(54) CUT TREE HYDRATING SYSTEM

(76) Inventor: James L. Beck, Los Gatos, CA (US)

(*) Notice: Subject to any disclaimer, the term of this patent is extended or adjusted under 35 U.S.C. 154(b) by 69 days.

(21) Appl. No.: 13/206,520

(22) Filed: Aug. 10, 2011

(65) Prior Publication Data

US 2013/0036667 A1 Feb. 14, 2013

(51) Int. Cl.
*A47G 33/12* (2006.01)
(52) U.S. Cl.
USPC .................................. 47/40.5; 47/48.5
(58) Field of Classification Search
USPC ............ 47/40.5, 66.7, 79, 48.5, 41.01, 41.15, 47/59 S; 434/225; 40/305; 206/232, 423; 71/64.11
See application file for complete search history.

(56) References Cited

U.S. PATENT DOCUMENTS

| | | | | |
|---|---|---|---|---|
| 2,664,670 A * | 1/1954 | Mulford | ............................. | 47/84 |
| 5,016,389 A * | 5/1991 | Odom, Jr. | ...................... | 47/48.5 |
| 5,615,516 A * | 4/1997 | Brown | ........................... | 47/40.5 |
| 6,427,378 B1 * | 8/2002 | Obonai et al. | ..................... | 47/44 |
| 7,423,106 B2 * | 9/2008 | Doane et al. | .................. | 527/103 |
| 8,250,805 B2 * | 8/2012 | Jaiswal | ......................... | 47/41.01 |
| 2002/0134013 A1 * | 9/2002 | Obonai et al. | ................. | 47/65.5 |
| 2004/0148852 A1 * | 8/2004 | Musak | ............................. | 47/40.5 |
| 2009/0013598 A1 * | 1/2009 | Mileto | ............................. | 47/48.5 |
| 2009/0025290 A1 * | 1/2009 | Trabka | ............................. | 47/66.7 |
| 2011/0289841 A1 * | 12/2011 | Thrash | ............................. | 47/59 S |
| 2012/0311968 A1 * | 12/2012 | Jaiswal | ............................ | 53/414 |
| 2013/0020738 A1 * | 1/2013 | Rubin | ........................... | 264/319 |

* cited by examiner

*Primary Examiner* — T. Nguyen
(74) *Attorney, Agent, or Firm* — Imperium Patent Works; T. Lester Wallace; Helen Z. Mao (57) ABSTRACT

A first instruction is provided to add the contents of a container to the reservoir bowl portion of a tree stand, where the material includes an amount of a SuperAbsorbent Polymer (SAP). A second instruction is provided to add ice. In one example, an assembly includes a container, where the SAP is in the container, and where the container bears the instructions. This assembly is provided to the user. The user follows the instructions, and pours the contents into the reservoir bowl, and then adds ice to the reservoir bowl. The melting ice hydrates the SAP. The hydrated SAP then transfers moisture to a cut tree held by the stand. Water is replenished by adding more ice. No water must be poured or handled to hydrate the tree, so spilling and difficulties associated with pouring volumes of water into the bowl portion are avoided. The SAP is reusable and biodegradable.

8 Claims, 6 Drawing Sheets

CONTAINER BEARING PRINTED INSTRUCTIONS TO USE THE CONTENTS (A SUPERABSORBENT POLYMER) TO HYDRATE A CUT TREE

CUT TREE IN A TREE STAND (PRIOR ART)
FIG. 1

(PRIOR ART)
FIG. 2

CONTAINER BEARING PRINTED INSTRUCTIONS TO USE THE CONTENTS (A SUPERABSORBENT POLYMER) TO HYDRATE A CUT TREE

FIG. 3

CUT TREE IN A TREE STAND

FIG. 4

ADD SUPERABSORBENT POLYMER TO
THE BOWL OF THE TREE STAND

FIG. 5

SUPERABSORBENT POLYMER IN
THE BOWL OF THE TREE STAND

FIG. 6

ADD ICE TO HYDRATE THE
SUPERABSORBENT POLYMER

FIG. 7

THE HYDRATED SUPERABSORBENT POLYMER
PROVIDES MOISTURE TO THE CUT TREE

FIG. 8

WATER PERMEABLE CONTAINER THAT CONTAINS AN AMOUNT OF SUPERABSORBENT POLYMER

FIG. 9

CROSS-SECTIONAL SIDE VIEW OF THE CONTAINER OF FIG. 9 (TAKEN AT LINE A-A)

FIG. 10

PLACE THE WATER PERMEABLE CONTAINER CONTAINING SUPERABSORBENT POLYMER INTO THE BOWL OF A TREE STAND

CUT TREE HYDRATING SYSTEM

TECHNICAL FIELD

The present disclosure relates to hydrating cut trees, and to related structures and methods.

BACKGROUND

During the Christmas season, conifer trees are often cut and installed in the home or other buildings in celebration of the season. Such a cut tree is usually installed in some kind of stand. The stand holds the tree erect, and also retains an amount of water around the bottom of the trunk where the tree was severed from its root. In order to keep the tree looking fresh and green as long as possible, and in order to prevent the needles from falling off the tree prematurely, it is important that the bottom of the trunk be provided with a constant source of water.

Figure 1:
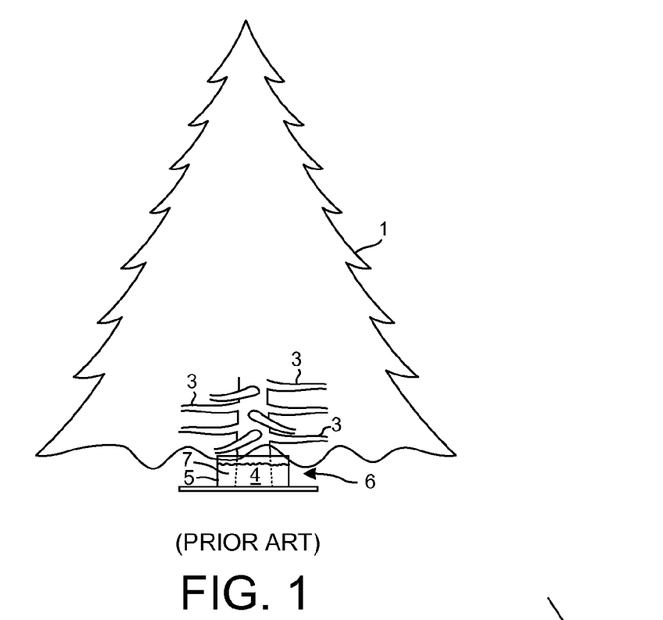
FIG. 1 (prior art) is a diagram of a cut tree 1 in a tree stand.

FIG. 1 (Prior Art) is a diagram of such a cut tree 1. The bottom part of the trunk 2 of the tree is illustrated. Numerous branches 3 extend laterally way from the axis of the trunk as illustrated. The bottom 4 of the trunk where the tree was severed from its root is inserted into a reservoir bowl portion 5 of a tree stand 6. As mentioned above, a supply of water 7 is to be maintained in the bowl portion 5 to keep the tree hydrated. When the tree is initially set in place, an amount of water is put into the reservoir bowl portion 5. Moreover, as the tree takes up water from the bowl over time, more water is put into the bowl to replenish the amount absorbed by the tree.

Figure 2:
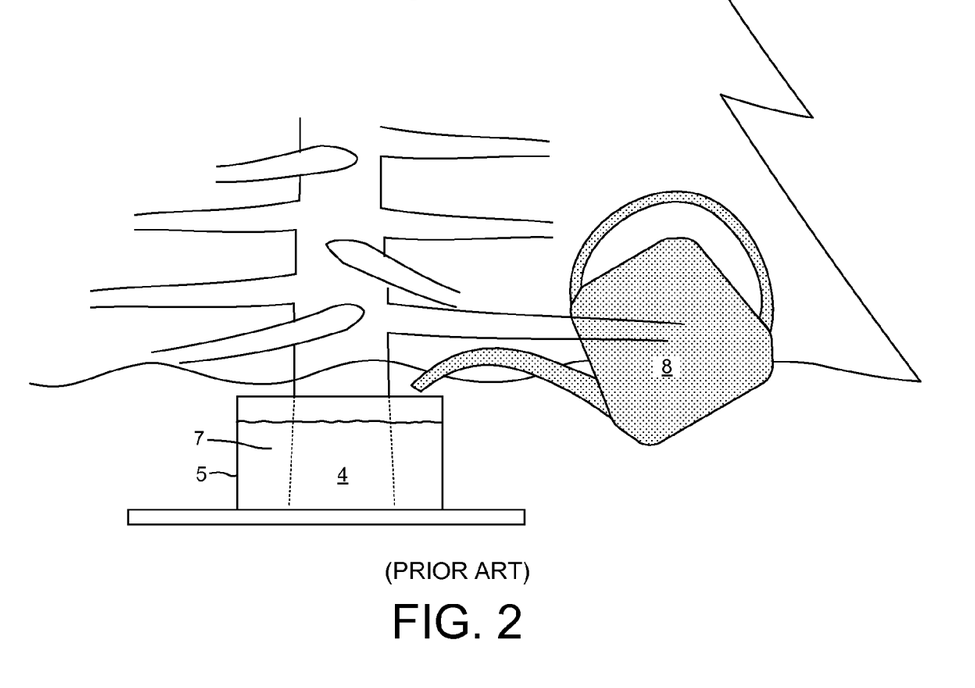
FIG. 2 (Prior Art) is a diagram that illustrates a way that water is added to hydrate the cut tree of FIG. 1.

FIG. 2 (Prior Art) is a diagram that illustrates a way that water is added to hydrate the tree. A vessel 8, such as the small watering can illustrated in the diagram, contains an amount of water. The vessel is brought above the level of the lip 9 of the reservoir bowl portion 5, and is tipped, so that water within the vessel can flow by gravity from the vessel and into the bowl. Performing this pouring task is often difficult for several reasons. There may be thick branches that prevent the watering vessel from being in a high enough position in the center of the tree to pour water down into the bowl. A small watering vessel may not be available or convenient, so an attempt to put water into the bowl using a somewhat large vessel may further complicate the pouring process. In addition, the tree may be heavily decorated with decorations and may be banded with strands of wired lights. The decorations may be fragile, and may become detached from the tree quite easily by touching the decorations themselves, or by touching another part of the tree. Getting the vessel into position to pour water into the bowl may be very difficult due to the presence of such fragile decorations and obstructing strands of lights. Due to such difficulties, water may be spilled in the area under the tree. The replenishing of water in the tree stand may be a frustrating experience. Other watering methods have been used, including pumping and siphoning, but these methods also suffer from similar difficulties of getting water into the bowl without spilling or damaging the tree decorations and setup.

SUMMARY

A first instruction is provided to an end user to add the contents of a container to a reservoir bowl portion of a tree stand, where the material includes an amount of a SuperAbsorbent Polymer (SAP). A second instruction is provided to the end user to add ice to the reservoir bowl portion. The amount of SAP is provided to the end user. This providing of the amount of SAP may occur to the end user may occur either before or after the first and second instructions are provided to the end user. The instructions may be provided in printed form along with the SAP, or the instructions may be provided in another way.

In a first example, an assembly includes a container, where the amount of the SAP is in dry form in the container, and where the container bears the instructions in printed form. The container may also contain an organic surfactant in powder form, a plant nutrient in powder form, an acidifier in powered form, and an antibacterial agent in powder form. This assembly is provided to the user. The user follows the instructions on the container, and pours the contents of the container into the reservoir bowl portion of the tree stand. The user then adds ice to the reservoir bowl portion as instructed. The melting ice hydrates the SAP. The method of placing the contents of the container and adding the ice can be reversed so that the ice is added first, followed by the contents of the container. The hydrated SAP then transfers moisture to the bottom of a cut tree that is being held upright in and by the tree stand. Water that the cut tree absorbs from the hydrated SAP is replenished by adding more ice. In this process, no water is poured or handled, and yet the cut tree is hydrated. Because no water is poured or handled, spilling and difficulties associated with pouring volumes of water into the reservoir bowl portion of a tree stand are avoided. The SAP is reusable and biodegradable.

In a second example, the container of the assembly is a water permeable container. The entire assembly is placed in the reservoir bowl portion of the tree stand, or is otherwise put in contact with the bottom of a cut tree. In the case of the assembly being placed in the bottom of the reservoir bowl portion of the tree stand, the bottom of the tree can be placed in the stand so that when the SAP expands as a result of absorbing water, the moist surface of the water permeable container will be pressed against the tree so that the tree can absorb water from the SAP. After the assembly is in place, ice is added and is allowed to melt. Water from the melting ice is absorbed by the SAP in the water permeable container. The SAP expands and makes good contact with the tree trunk. The SAP thereafter gives up water to the bottom of the cut tree, thereby hydrating the cut tree. The container contains the SAP regardless of whether the SAP is in its hydrated and swelled form, or is in its dehydrated and shrunken form. The container facilitates the handling and reuse of the SAP.

Further details and embodiments and techniques are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figures 3, 4:
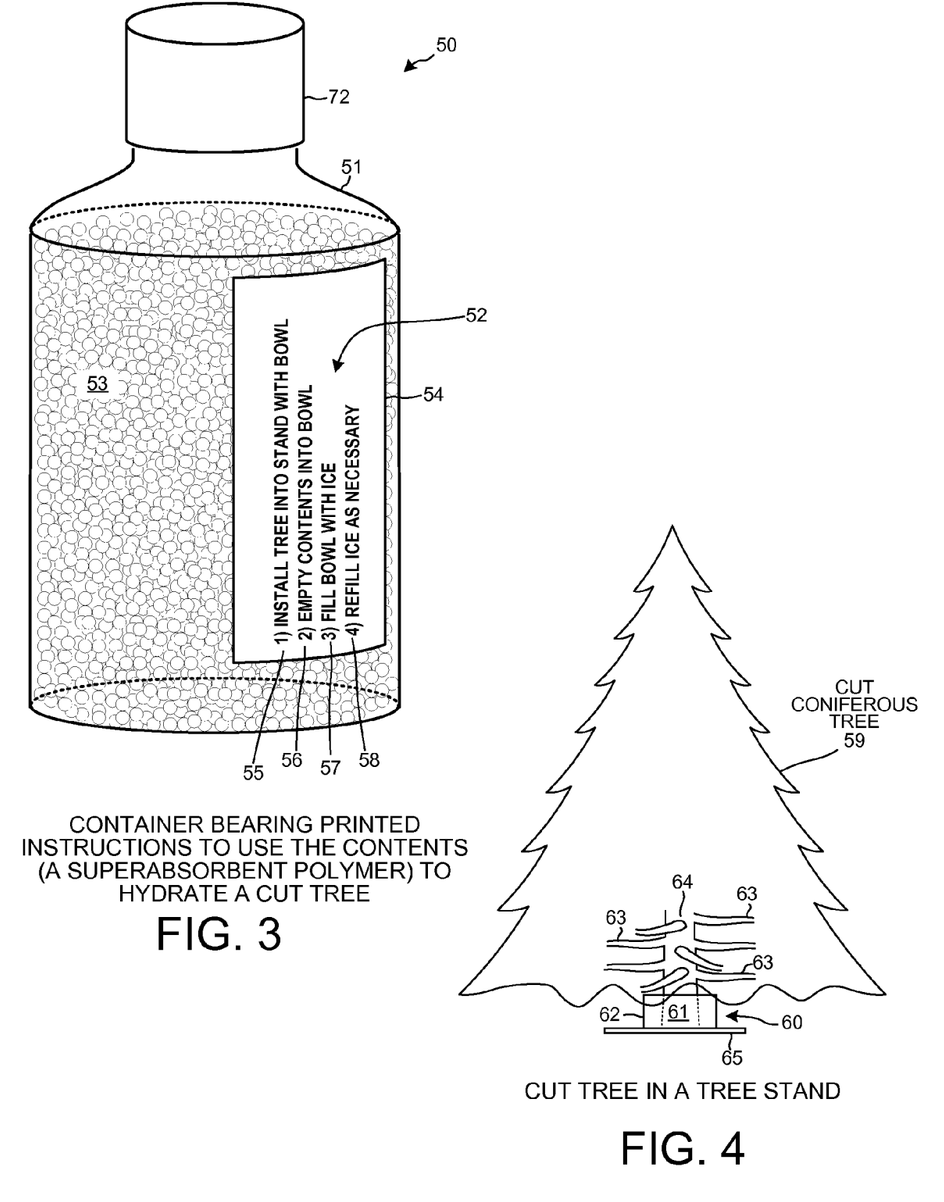
FIG. 3 is a diagram of an assembly 50 in accordance with one novel aspect, where the assembly 50 includes a container (that contains an amount of a SuperAbsorbent Polymer (SAP)) and a printed instruction to use the contents of the container to hydrate a cut tree.
FIG. 4 is a diagram that illustrates a cut tree installed in a tree stand in a step of a novel method.

FIG. 3 is a diagram of an assembly 50 in accordance with one novel aspect. Assembly 50 includes a container 51, printed instructions 52, and a material 53 contained by the container. The material 53 principally includes an amount of a hydrophilic SuperAbsorbent Polymer (SAP) in dry form. The material 53 also includes an amount of a plant nutrient in powder form, an amount of an organic surfactant in powder form, an amount of an acidifier in powered form, and an amount of an antibacterial agent in powder form.

SuperAbsorbent Polymers (SAP) are a class of hydrophilic polymers that can absorb a large amount of water relative to their own mass, and then later release that water as environmental conditions change. Some SAP materials can absorb up to 500 times its weight in water and swell to 60 times its original volume. There are several different SAPs including acrylamides and polyacrylamides, but examples of SAPs commonly marketed for agricultural use include potassium polyacrylamide, sodium polyacrylamide potassium polyacrylate, and sodium polyacrylate. These SAPs when marketed for agricultural use are sometimes referred to as hydrogels. Sodium polyacrylate is the common name for the IUPAC name of sodium prop-2-enoate. It has a molecular formula of $C_3H_3NaO_2$. It is commercially available in different forms such as white crystalline granules or small spherical beads. The spheres when swollen with absorbed water may be 15 mm in diameter.

In the example pictured in FIG. 3, the container is a clear, water-impervious, plastic bottle with a screw on cap 72. The container encloses a volume of about 120 milliliters. The amount of SAP contained in the container 51 is approximately 110 milliliters. In the illustrated example, the SAP is potassium polyacrylate. The printed instructions 52 are printed on a label 54 that adheres to container 51. The printed instructions 52 for use include: a first instruction 55 to "Install tree into stand with bowl", a second instruction 56 to "Empty contents into bowl", a third instruction 57 to "Fill bowl with ice", and a fourth instruction 58 to "Refill ice as necessary".

A vendor advertises or otherwise promotes use and sale of the assembly 50. In one example, bottles such as the bottle illustrated in FIG. 3 are offered for sale by the vendor on the internet. In another example, bottles such as the bottle illustrated in FIG. 3 are made available by the vendor for purchase at a retail location where cut trees are sold. In another example, bottles such as the bottle illustrated in FIG. 3 are provided for sale by the vendor in a retail store such as, for example, a store where Christmas tree ornaments and decorations are sold.

In a first step of a method, an end user purchases the assembly 50. The user then starts to follow the printed instructions 52 for use.

FIG. 4 is a diagram that illustrates a second step of the method. The end user installs a cut tree 59 in a tree stand 60. Tree stand 60 includes a base portion 65 having a wide foot print to prevent the tree from falling over. Tree stand 60 further includes a reservoir bowl portion 62. Although one particular type of tree stand is pictured here for illustrative purposes, the tree stand may be one of many other suitable types of tree stands.

Cut tree 59 is an evergreen coniferous tree such as, for example, a pine tree, a fir tree, or a redwood tree of a type and size appropriate for the Christmas season. The tree 59 is a cut tree in that its trunk has been cut at or near its base so as to sever the above-ground foliage and trunk portion of the tree from its root portion. The tree is cut in a plane perpendicular to the lengthwise axis of the trunk of the tree. The bottom portion 61 of the trunk is placed down into the reservoir bowl portion 62 of the tree stand 60. The reservoir bowl portion 62 is capable of retaining an amount of water so that water remains in contact with the bottom of the tree as the tree is installed in the stand. Although the reservoir bowl portion 62 has this capability, there is no water in the bowl at this point in the method. Numerous branches 63 extend laterally away from the central axis of the trunk 64 as illustrated.

Figure 5:
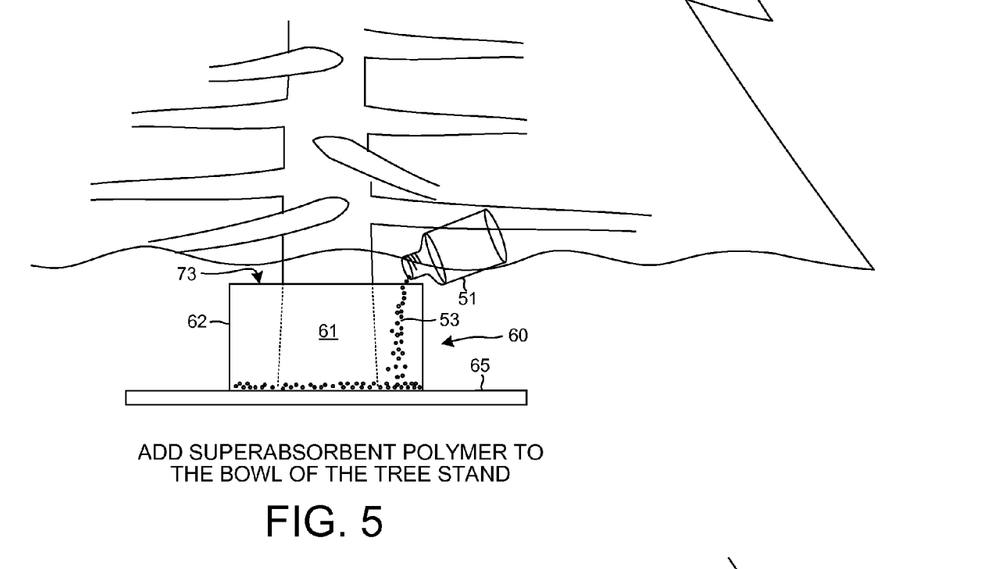
FIG. 5 is a diagram that illustrates a subsequent step of pouring the contents of the container of the assembly of FIG. 3 into a reservoir bowl portion of the tree stand.

FIG. 5 is a diagram that illustrates a third step of the method. The user follows the second instruction 56 and empties the material 53 from container 51 into the reservoir bowl portion 62 as illustrated. This task is typically much easier than is the water pouring task pictured in FIG. 2 because container 51 is much smaller than the vessel 8 of FIG. 2. Navigating the branches in the center of the tree to get the relatively small container in position to pour its contents into bowl portion 62 is a much easier task than is navigating the branches with the large vessel 8 of FIG. 2 to get the large vessel into position to pour water into the bowl portion. Furthermore, emptying the material 53 into the bowl portion 62 is easier than is the water pouring task pictured in FIG. 2 because no liquids are involved, and because the total volume of material 53 to be put into the bowl portion 62 is small as compared to the large volume of water poured from the vessel 8 in FIG. 2.

Figure 6:
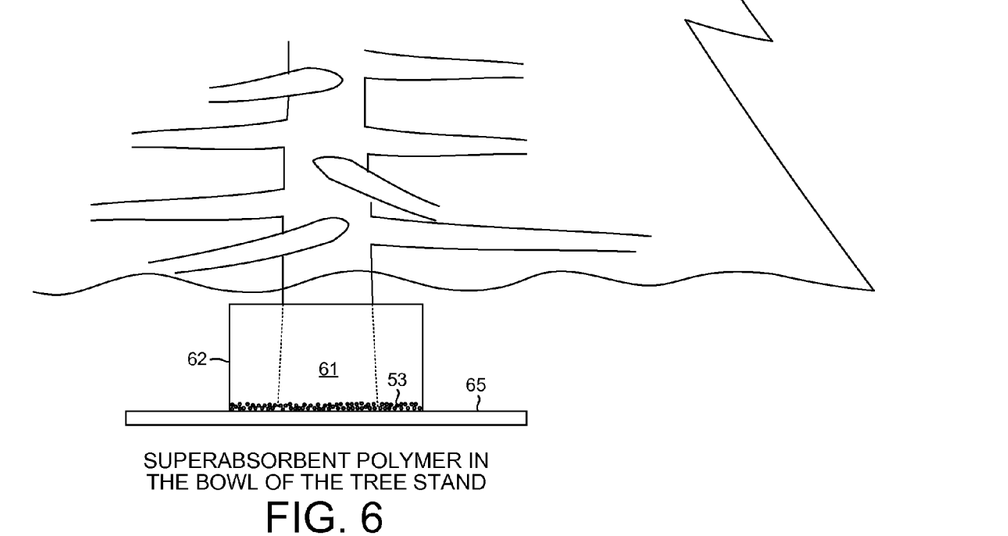
FIG. 6 is a diagram that illustrates the result of the pouring step of FIG. 5.

FIG. 6 is a diagram that illustrates the result of the third step. Material 53 is shown on the bottom inside surface of the reservoir bowl portion 62. Some of the SAP beads of material 53 are in contact with the trunk, or are otherwise very close to the trunk. No special care need be used in putting the material 53 into bowl.

Figure 7:
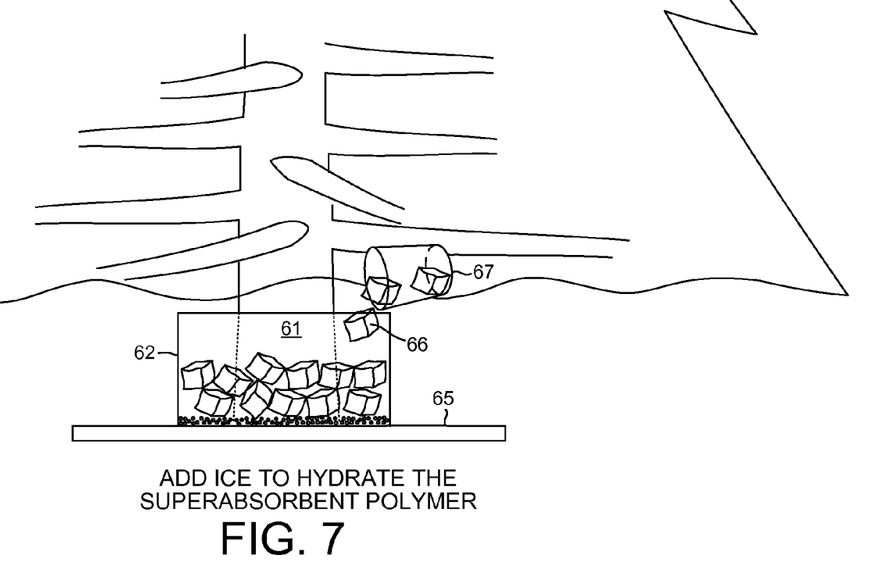
FIG. 7 is a diagram that illustrates a subsequent step of adding ice to the reservoir bowl portion of the tree stand, thereby hydrating the SAP.

FIG. 7 is a diagram that illustrates a fourth step in the method. The user follows the third instruction 57 and fills the reservoir bowl portion 62 to the upper rim 73 with ice 66 (frozen water). In the illustrated example, the ice 66 is added in the form of ice cubes from a relatively small cup 67. The cup 67 is used to make numerous transfers of ice cubes from a larger container (not shown) of ice cubes. The ice is simply dropped into the reservoir bowl portion 62. Little or no water is spilled because no water is being poured or handled. Only solid ice is being handled.

Figure 8:
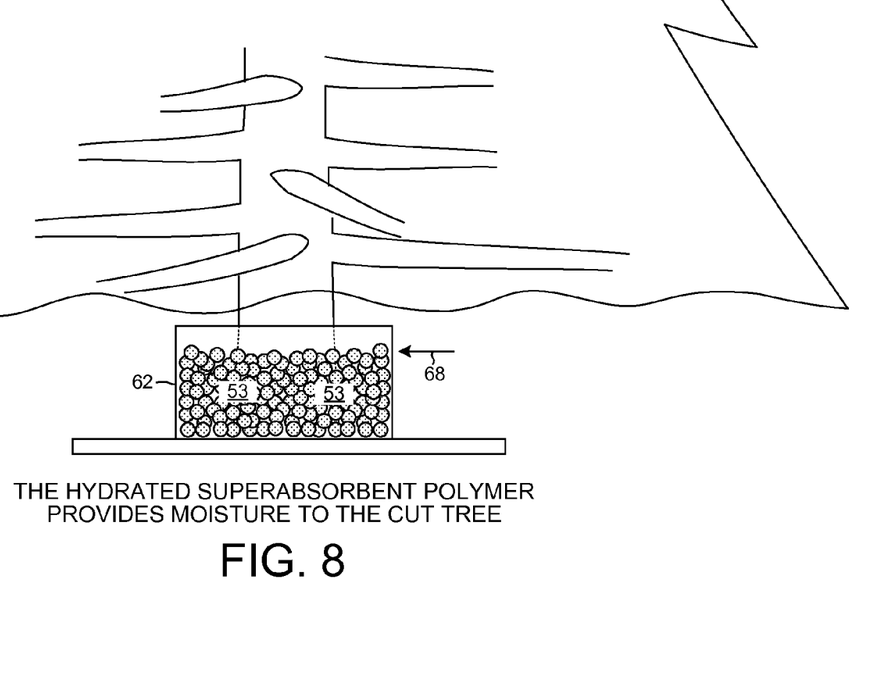
FIG. 8 is a diagram that illustrates the hydrated SAP.

FIG. 8 is a diagram that illustrates a fifth step in the method. The ice 66 is allowed to melt, and the resulting water is absorbed by the SuperAbsorbent Polymer (SAP) beads. Each SAP bead can absorb up to 500 times its weight in water and can swell to be 60 times its original volume. When the beads have absorbed all the water they can, each bead is about the size of a small marble. These large beads are soft, and water-filled, and conform to the bottom portion 61 of the trunk of the tree. As the beads swell, they are press against the inside wall of the reservoir bowl portion and therefor push themselves into contact with the trunk. Then over time, the beads of SAP give up their absorbed water to the tree, thereby hydrating the tree. The organic surfactant constituent of material 53 is a wetting agent that assists absorption from the saw cut circular bottom surface of the trunk.

As the SAP beads give up their water to the tree, the level 68 of the swollen SAP beads in the reservoir bowl portion 62 drops. The user replenishes this water by adding more ice to the reservoir bowl portion 62. Water from the added melting ice is absorbed by the SAP beads and the level 68 of the swollen beads rises again. The size of the swollen beads, or the level 68 of the swollen beads, is usable by the end user as a visual indicator to determine when more ice should be added.

After the holiday season, when the cut tree is to be taken down, the contents of the reservoir bowl portion 62 can be stored for reuse next year, or can be put into compost, or can be kept to keep cut flowers hydrated, or can be used in the garden to improve soil water absorbency, or can simply be discarded. The SAP biodegrades slowly and naturally into harmless organic materials such as ammonia (and/or other nitrogen compounds) and carbon dioxide (and/or carbon dioxide).

Figures 9, 10, 11:
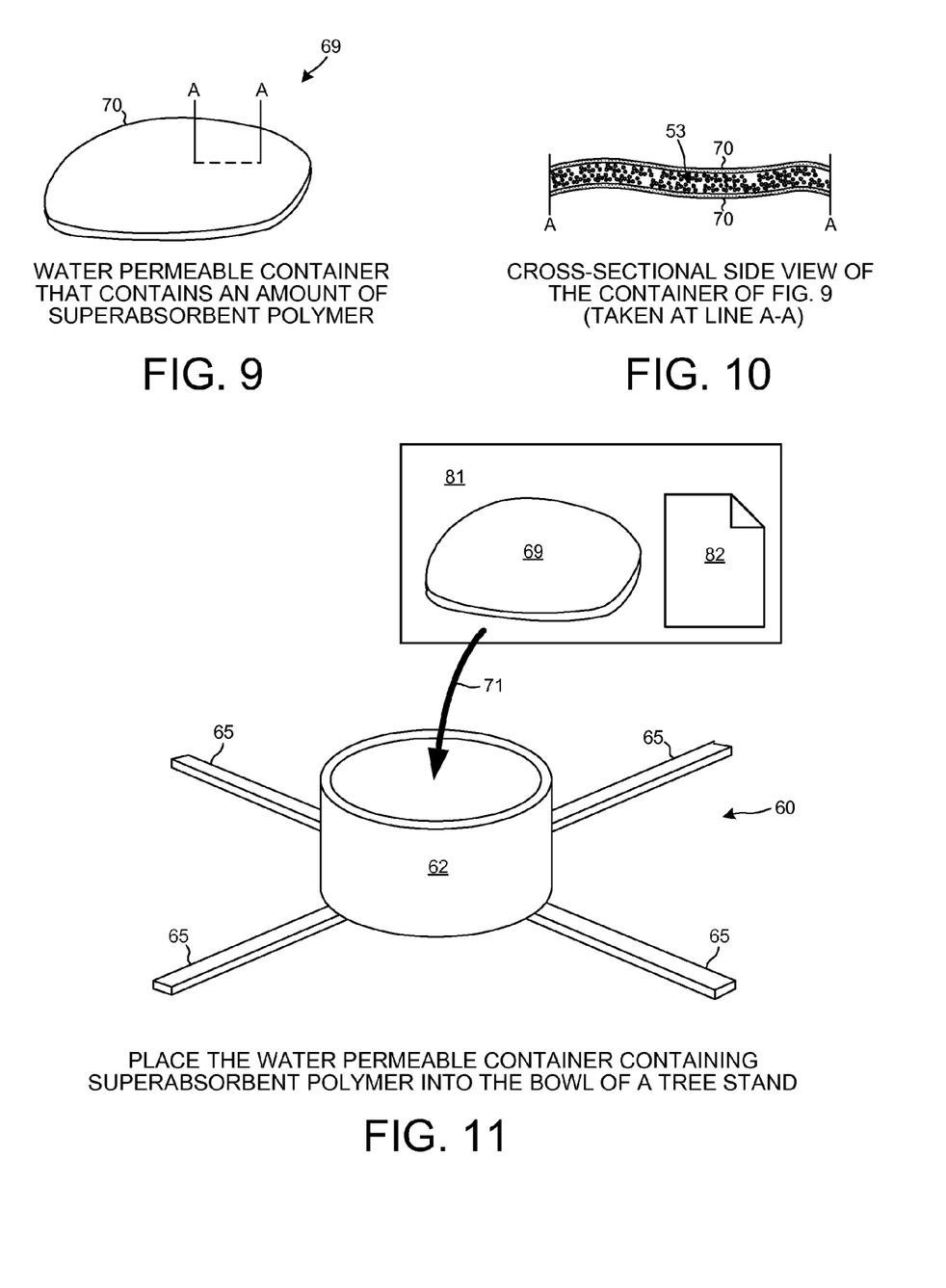
FIG. 9 is a diagram of another example of an assembly, where the assembly includes a container (that contains an amount of a SuperAbsorbent Polymer (SAP)) and printed instructions. The instructions include an instruction to use the assembly to hydrate a cut tree.
FIG. 10 is a cross-sectional side view of the assembly of FIG. 9, where SAP beads are present in the container.
FIG. 11 is a diagram that illustrates a use of the assembly of FIG. 9.

FIG. 9 is a diagram of an assembly 69. In the example of assembly 69, the container 70 is a disc-shaped pouch of water permeable cloth or fabric. The container 70 contains the same amount and type of material 53 as in the example discussed above in connection with FIG. 3.

FIG. 10 is an expanded cross-sectional side view of the assembly 69 of FIG. 9 taken along sectional line A-A. Reference numerals 70 identify the top and bottom sheets of the water permeable cloth or fabric. Retained in the water permeable container 70 is the material 53. The small spheres in the diagram of FIG. 10 represent the beads of the SAP of the material mixture 53. The overall appearance and feel of assembly 69 is that of a beam bag.

FIG. 11 is a diagram that shows a use of the assembly 69 of FIG. 9. The assembly 69 is provided to an end user in package 81 that contains the assembly 69 and that also contains printed instructions for use. The package 81 may be cardboard box, or may involve a transparent plastic face so that the assembly 69 within the package 81 can be seen in a store display (through the package) by a potential purchaser. The package may be used just to ship the assembly 69, or the package 81 may be used to hold the assembly 69 for customer view in a retail store environment. In the example of assembly 69, the printed instructions may be present on the assembly 69 itself, or may be present on a piece of paper 82 contained in the package along with the assembly, or may be printed on the package. Regardless of where the printed instructions are found, the user reads the instructions and follows them. One of the instructions is to place the assembly into the reservoir bowl portion 62 of the tree stand 60. In FIG. 11, the arrow 71 represents this placing of assembly 69 into bowl portion 62. A cut tree (not shown) is then placed into the reservoir bowl portion such that the bottom cut surface of the tree trunk is down and contacting the upper cloth or fabric surface of assembly 69. Assembly 69 is sandwiched between the bottom inside surface of the reservoir bowl and the bottom of the tree trunk.

After the cut tree has been installed in the tree stand in this way, then an instruction of the printed instructions to add ice is followed. The user added ice to the reservoir bowl portion 62. As the ice then melts, water from the melting ice passes through the water permeable container 70 and to the SAP beads that then absorb the water. The SAP beads swell as in the example of FIG. 8 described above, but in the case of assembly 69 the beads are retained in the water permeable container 70. The water soluble powders of the material 53 (the plant nutrient, the organic surfactant, the antibacterial agent, and the acidifier) can pass through the water permeable container 70 to the tree trunk along with moisture released by the SAP beads. Container 70 facilitates the handling of the SAP beads, whether the beads are in their hydrated swelled form, or in their dehydrated shrunken form. At the end of the season when the cut tree is taken down from its stand, the assembly 69 is simply removed from the reservoir bowl portion 62 as a single unit. Assembly 69 can be put to the side, allowed to dry completely, and then stored for reuse the next year.

Figure 12:
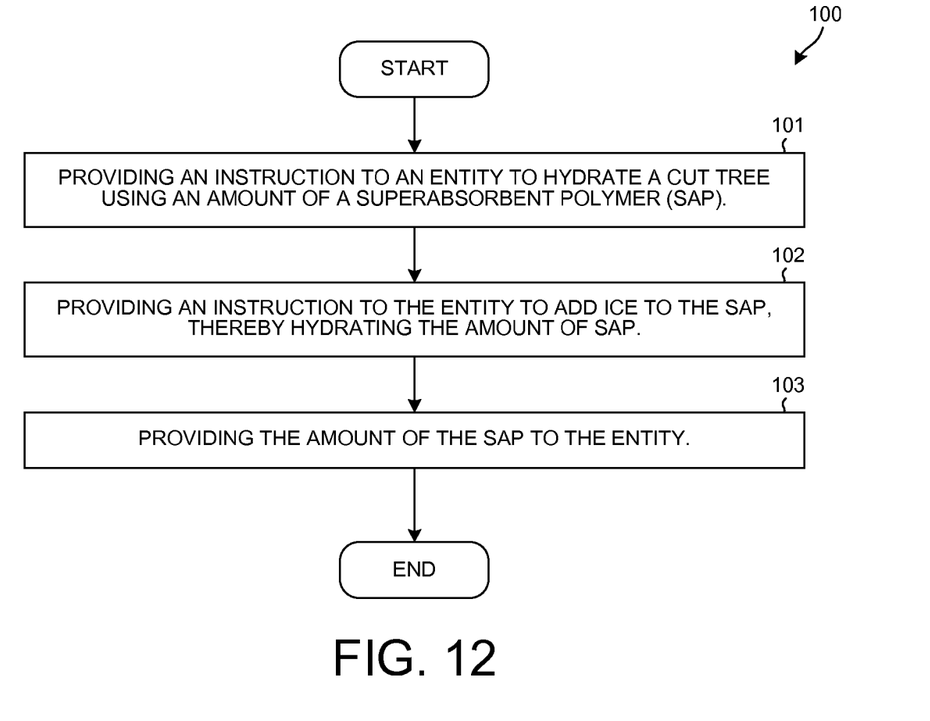
FIG. 12 is a flowchart of a first method 100.

FIG. 12 is a flowchart of a method 100. An instruction is provided (step 101) to an entity to hydrate a cut tree using an amount of a material, where the material includes an amount of a SuperAbsorbent Polymer (SAP). In one example, this step involves instructing an end user to dispense the contents of the container 51 as pictured in FIG. 5. An instruction is provided (step 102) to the entity to add ice to the SAP, thereby hydrating the amount of SAP. In one example, this step involves instructing the end use to add ice as illustrated in FIG. 7. In addition to providing these instructions to the entity, the amount of SAP is provided (step 103) to the entity. In one example, this step involves providing the assembly 50 of FIG. 3 to the end user. The step 103 of providing the amount of SAP to the entity can occur before or after the steps 101 and 102 of providing the instructions.

Figure 13:
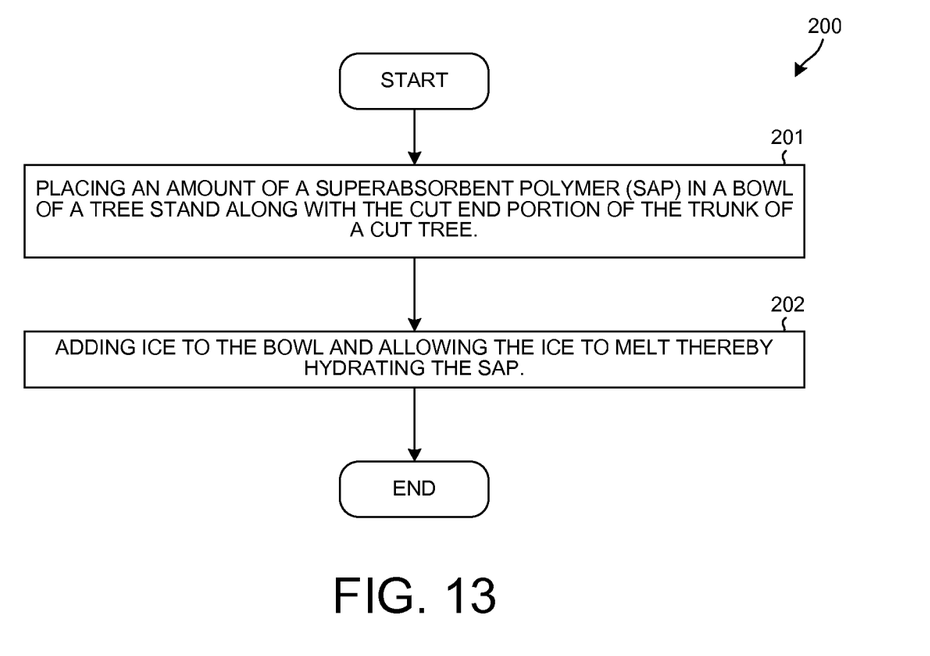
FIG. 13 is a flowchart of a second method 200.

FIG. 13 is a flowchart of a method 200. An amount of a SuperAbsorbent Polymer (SAP) is placed (step 201) in a reservoir bowl portion of a tree stand along with the cut end portion of the trunk of a cut tree. The SAP can be added to the reservoir bowl portion after the tree has already been installed in the tree stand, or the SAP can be added to the reservoir bowl portion and thereafter the tree is installed in the tree stand. In one example, this step 201 is performed by an end user dispensing the contents of the container 51 as pictured in FIG. 5. Ice is then added (step 202) to the reservoir bowl portion of the tree stand and the ice is allowed to melt so that water from the melting ice hydrates the SAP. In one example, this step is performed by the end user adding ice to the reservoir bowl portion of the tree stand as illustrated in FIG. 7 so that the hydration of the SAP as pictured in FIG. 8 occurs. The hydrated SAP beads then give up their water to the cut tree, thereby hydrating the cut tree.

Although certain specific exemplary embodiments are described above in order to illustrate the invention, the invention is not limited to the specific embodiments. Accordingly, various modifications, adaptations, and combinations of various features of the described embodiments can be practiced without departing from the scope of the invention as set forth in the claims.

What is claimed is:
1. An assembly comprising:
   an amount of a SuperAbsorbent Polymer (SAP);
   a container that contains the SAP; and
   printed instructions, wherein the printed instructions include an instruction to use the contents of the container to hydrate a cut tree, and wherein the printed instructions further include an instruction to bring ice into contact with the contents of the container.

2. The assembly of claim 1, wherein the container bears the printed instructions.

3. The assembly of claim 1, wherein the assembly further comprises:
   a package that contains the container, wherein the package bears the printed instructions.

4. The assembly of claim 1, wherein the assembly further comprises:
   a piece of paper that bears the printed instructions; and
   a package that contains the container and the piece of paper.

5. The assembly of claim 1, wherein the container also contains a material taken from the group consisting of:
   a plant nutrient in powder form, an organic surfactant, an acidifier in powered form and an antibacterial agent.

6. The assembly of claim 1, wherein the container is taken from the group consisting of: a water impervious container, and water permeable container.

7. The assembly of claim 1, wherein the container is a fabric container that is water permeable.

8. The assembly of claim 1, wherein the printed instructions further include an instruction to place the container in a water reservoir bowl of a tree stand.

\* \* \* \* \*